US009810330B2

(12) United States Patent  
Næss-Schmidt et al.

(10) Patent No.: US 9,810,330 B2
(45) Date of Patent: Nov. 7, 2017

(54) VALVE FOR HANDLING AIR SUPPLY TO SQUEEZING PADS IN A LIFT HEAD

(71) Applicant: Qubiqa A/S, Arden (DK)

(72) Inventors: Steffen E. Næss-Schmidt, Vodskov (DK); Signe D. Tovgaard, Hobro (DK)

(73) Assignee: Qubiqa A/S, Arden (DK)

(*) Notice: Subject to any disclaimer, the term of this patent is extended or adjusted under 35 U.S.C. 154(b) by 0 days.

(21) Appl. No.: 15/313,754

(22) PCT Filed: May 27, 2015

(86) PCT No.: PCT/EP2015/061698
§ 371 (c)(1),
(2) Date: Nov. 23, 2016

(87) PCT Pub. No.: WO2015/181231
PCT Pub. Date: Dec. 3, 2015

(65) Prior Publication Data
US 2017/0191575 A1 Jul. 6, 2017

(30) Foreign Application Priority Data

May 27, 2014 (EP) ..................................... 14169966

(51) Int. Cl.
*A47J 45/00* (2006.01)
*F16K 11/07* (2006.01)
(Continued)

(52) U.S. Cl.
CPC ....... *F16K 11/0708* (2013.01); *B25J 15/0023* (2013.01); *B25J 15/0616* (2013.01); *F16K 37/0025* (2013.01)

(58) Field of Classification Search
CPC ............... B25J 15/0023; B25J 15/0616; F16K 11/0708; F16K 37/0025; F16K 17/02; F16K 21/04; H01L 21/6838
See application file for complete search history.

(56) References Cited

U.S. PATENT DOCUMENTS 3,236,253 A 2/1966 Symmons
3,771,562 A 11/1973 Curran
(Continued)

FOREIGN PATENT DOCUMENTS

WO  0064790  11/2000
WO  2008019691 A1  2/2008
(Continued)

*Primary Examiner* — Stephen Vu
(74) *Attorney, Agent, or Firm* — Barclay Damon LLP

(57) ABSTRACT

The present invention relates to a valve to be used when blowing air into squeezing pads from a high pressure blower such as a side duct blower, said valve comprising a valve chamber comprising a primary set of openings with a first opening connected to said high pressure blower and a second opening connected to said squeezing pads, whereby air can be transferred through said valve chamber between said squeezing pads and said high pressure blower, said valve chamber further comprising a third opening, whereby air from said first opening can pass through said third opening, and where air not passing through said third opening passes through said second opening, said valve further comprising a valve spool for blocking said third opening and thereby changing the amount of air passing through said third opening. The valve spool for blocking said third opening comprises a limiter element, wherein said limiter element and/or said third opening has a varying diameter along its longitudinal axis, where the limiter element is adapted to be inserted along its longitudinal axis in said third opening, and where the extent of insertion of said limiter element changes the amount of air passing through said third opening. The invention further relates to a lift head with the above valve.

20 Claims, 9 Drawing Sheets

(51) Int. Cl.
   *B25J 15/00*      (2006.01)
   *B25J 15/06*      (2006.01)
   *F16K 37/00*      (2006.01)

(56) References Cited

U.S. PATENT DOCUMENTS

| | | | | | |
|---|---|---|---|---|---|
| 3,995,955 | A | * | 12/1976 | Topfer | G03F 7/2014 355/76 |
| 4,484,813 | A | * | 11/1984 | Maher | G03B 27/20 355/93 |
| 4,704,028 | A | * | 11/1987 | Richards, Sr. | G03B 27/20 355/92 |
| 2011/0180740 | A1 | | 7/2011 | Marica | |
| 2013/0112281 | A1 | | 5/2013 | Morgan et al. | |

FOREIGN PATENT DOCUMENTS

| | | | |
|---|---|---|---|
| WO | 2010097088 | A1 | 9/2010 |
| WO | 2015181231 | A1 | 12/2015 |

\* cited by examiner

VALVE FOR HANDLING AIR SUPPLY TO SQUEEZING PADS IN A LIFT HEAD

CROSS REFERENCE TO RELATED APPLICATIONS

This application is a national stage application pursuant to 35 U.S.C. §371 of International Application No. PCT/EP2015/061698, filed on May 27, 2015, which claims priority to, and the benefit of, European Patent Application No. 14169966.0, filed on May 27, 2014. The entire contents of such applications are hereby incorporated herein by reference.

FIELD OF THE INVENTION

The present invention relates to a valve to be used when blowing air into squeezing pads in a lift head. The invention further relates to a lift head with such a valve.

BACKGROUND

In order to provide effective and cheap distribution of goods, many goods are distributed on pallets, by way of example on so-called EU pallets (800×1200 mm). Yet a continuously increasing need has appeared for also dispatching orders comprising smaller consignments of goods in a correspondingly efficient way. Statistically, it has appeared that many orders for small shops actually consist of consignments of goods often consisting of very few layers or maybe just a single layer of palletised goods.

WO 2000/64790 A1, WO 2008/019691 A1, WO2010097088 A1 disclose apparatuses for handling layers of palletised goods, the apparatuses comprising a vertically displaceable lift head with a horizontal suction face which is adapted in size to a pallet and horizontal suction face consists of a large number of downwards open suction chambers. The suction face is arranged to be moved downwards against the top side of an upper layer of individually or group-wise packed goods on a pallet, where the suction chambers are connected via individual valves with a source of vacuum incorporated in the lift head, and where the apparatuses are intended for interacting with depalletising systems. The valves between the suction chambers and the source of vacuum are designed as ball valves with very light thin-walled valve bodies which are enclosed in the suction chamber by means of lateral projections or by means of a retainer net and which interact with upper round valve openings with spherical valve seats at the bottom if the actual suction chamber is not closed at the bottom by contacting the top side of the goods in an upper pallet layer. In connection with each valve, there are arresting means adapted to prevent the valve balls from shutting off the valves, such that it is ensured hereby that the shutoff valves of the suction face can be forcibly opened, when there is a contact to the goods in the pallet layer, and can be forcibly opened, when there are gaps or openings in the pallet layer. The descriptions of these previous inventions are hereby incorporated in the present application by reference.

In connection with the hitherto common handling of layers of palletised goods, it is known to work with rectilinear lifting and moving of pallet layers, i.e. moving pallet layers mutually between positions on mutually perpendicular pallet ways. Experiments have been made using robot technology for moving palletised layers of goods by means of current suction heads. However, the use of robots results in an entirely different movement pattern which also includes swinging movements of suction heads thus imposing significantly greater demands on the suction ability in order to hold the relatively heavy and possibly open pallet layer in a secure way during swinging movements, where centrifugal force actions occur.

Along the outer sides of the suction face, the lift head comprises squeezing means adapted to exert an inwardly pressure at the outer sides of the goods in at least an uppermost pallet layer. The squeezing means comprises a number of inflatable squeezing pads typically operated by a high pressure blower, by way of example a side duct blower.

A problem with these squeezing means is that goods might be damaged due to a high squeezing pressure and further, the packaging around the goods might be damaged or at least visually damaged. In both situations, the value of the goods will go down.

The object of the invention is to solve the above-mentioned problems.

GENERAL DESCRIPTION

This is obtained by a valve to be used when blowing air into squeezing pads from a high pressure blower, such as a side duct blower, said valve comprising a valve chamber comprising a primary set of openings with a first opening connected to said high pressure blower and a second opening connected to said squeezing pads, whereby air can be transferred through said air chamber between said squeezing pads and said high pressure blower, said valve chamber further comprising a third opening whereby air from said first opening can pass through said third opening and where air not passing through said third opening passes through said second opening, said valve further comprising a valve spool for blocking said third opening and thereby changing the amount of air passing through said third opening. The valve spool for blocking said third opening comprises a limiter element, wherein said limiter element and/or said third opening has a varying diameter along the longitudinal axis of said limiter element, where the limiter element is adapted to be inserted along its longitudinal axis in said third opening, and where the extent of insertion of said limiter element changes the amount of air passing through said third opening. Thereby, the delivered pressure from the high pressure blower can be changed by moving the limiter element up/down from the third opening. This makes it possible to control air pressure in squeezing pads, said air pressure being fed by the high pressure blower so that the variety of goods that need "soft touch" can thereby be handled.

In an embodiment, said limiter element has a diameter increasing in a direction away from the third opening. Thereby, the delivered pressure increases gradually and according to the slope of the element as the limiter element is inserted into the third opening.

In an embodiment, the limiter element is connected to actuating means for moving said limiter element along its longitudinal axis. Thereby, the actuator, such as a linear actuator, can be controlled for a precise control of the limiter element and thereby the air pressure in the squeezing pads.

In an embodiment, the valve further comprises a blocking element connected to said valve spool, said blocking element being used for blocking auxiliary sets of openings in said valve chamber. Thereby, the valve can further be used for emptying of air from the squeezing pads, whereby a multi-functional valve is obtained.

In an embodiment, the auxiliary sets of openings comprise a first and a second set of auxiliary openings. This embodiment ensures that a constant flow of air through the blower is possible which is required for maintaining the correct operation of the blower.

The present invention further relates to a lift head for lifting layers of goods comprising squeezing means and a valve according to the above.

In an embodiment, the lift head further comprises a curtain for closing below said lifted goods.

In an embodiment, the lift head further comprises a suction face.

BRIEF DESCRIPTION OF DRAWINGS

The invention is explained in detail below with reference to the drawings, in which.

DETAILED DESCRIPTION OF DRAWINGS

Figure 1:
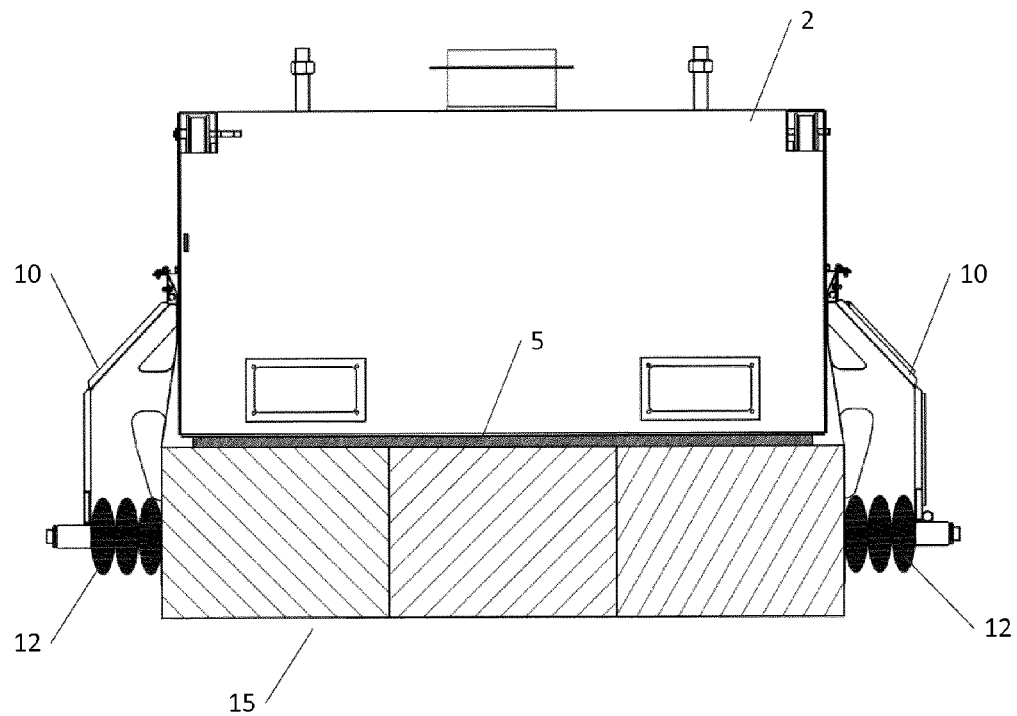
FIG. 1 illustrates a lift head according to the present invention.

FIG. 1 illustrates a lift head 2 for handling layers of palletised goods. In one embodiment, the lift head 2 could be mounted on a common industrial robot arm, whereby the movement pattern of the lift head 2 is considerably extended compared with a movement pattern where the lift head 2 is suspended from either a stationary or a movable lift hanger.

The lift head 2 includes a vertically adjustable, outer squeezing arrangement which comprises a number of inflatable squeezing pads 12 at the outer sides of the suction face. The squeezing pads 12 could be operated by a high pressure blower, by way of example a side duct blower, connected to the squeezing pads via a valve according to the present invention (not shown).

When lifting elements, the lift head is positioned above a pallet layer 15 e.g. consisting of regular, box-shaped items in such a way that the head surface 5 is parallel with the upper side of the pallet layer 15. The squeezing pads 12 are present at least on two opposite sides of the pallet layer 15. When the squeezing pads are inflated, an inward-directed squeeze pressure is exerted on the outer sides of the pallet layer 15.

Vertical adjustment and thereby adjustment of the squeezing arrangement with the squeezing pads could be done by means of the adjustment elements 10, such adjustment can be performed depending on the dimensions of the actual goods in the pallet layer and/or the pallet layer.

Figure 2:
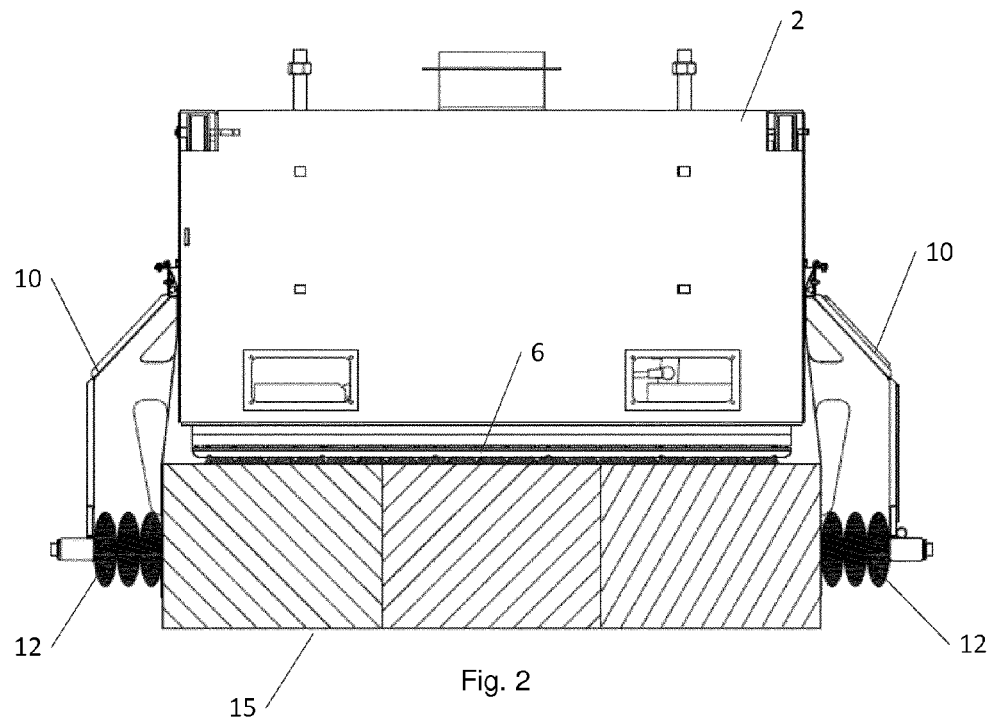
FIG. 2 illustrates an alternative embodiment of a lift head according to the present invention.

FIG. 2 further illustrates a lift head similar to FIG. 1, but instead of a passive head surface 5, a suction face 6 is provided. A suction face further improves the lifting capabilities of the lift head 2. The need of a lift head comprising a suction face depends on the type of goods to be lifted by the lift head.

In an embodiment, the suction face interacts with an external vacuum source in the form of a powerful centrifugal blower which communicate via an air distribution chamber and individual ball valves with a large number of downwardly open suction chambers jointly constituting a common rectangular suction face 6 which is adapted in size for a standard pallet, by way of example an EU pallet or a UK pallet.

The lift head could further comprise a lower curtain to close below the lifted goods. The curtain and the curtain parts could consist of a thin, flexible curtain of wear-resistant airtight material, for example a thin canvas-covered rubber curtain. A synthetic neoprene-rubber curtain is preferably used, by way of example with an anti-friction coating on the side which is in contact with the underside of the pallet layer 15 and the suction face 6, respectively. The curtain has double function, namely to ensure optimal sucking function when operating with a lift head having a suction face especially when lifting pallet layers with goods having a relatively open structure. Further, the curtain has the effect both with lift heads having a suction face and with lift heads not having a suction face that dropping of heavy articles can be avoided.

Figure 3A:
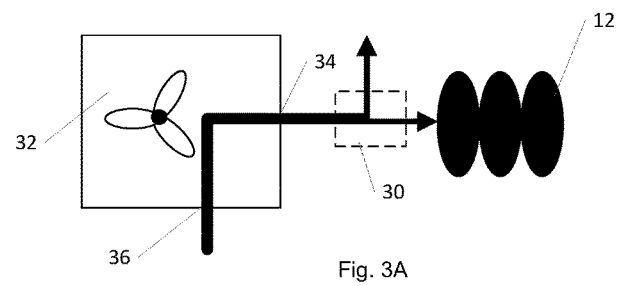
FIGS. 3A and 3B illustrate the principle in a valve according to the present invention handling air supply to squeezing pads.

FIG. 3A illustrates the principle of the valve 30 to be used for controlling the air pressure inside the squeezing pads 12. In FIG. 3A, the high pressure blower 32 blows air from an outlet 34 into the squeezing pads 12 via the valve 30. The high pressure blower 32 draws air from its surroundings via an inlet 36 and blows it into the squeezing pads 12 via a connecting channel. The high pressure blower can blow into the squeezing pads 12 and thereby, a pressure is obtained inside the pads. This pressure can be determined by the valve 30, where part of the airflow from the high pressure blower 32 and towards the squeezing pads 12 is separated by the valve 30 and thereby not fed to the squeezing pads 12. The pressure deliverable by a high pressure blower 32 is determined by the type of high pressure blower being used. The valve 30 is used to decrease this pressure to a lower pressure.

Figure 3B:
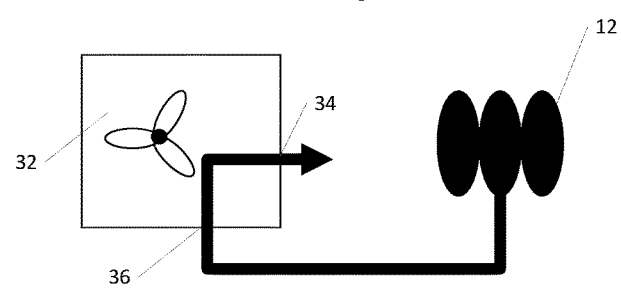

FIG. 3B illustrates the situation, where the high pressure blower empties the squeezing pads of air. Here the high pressure blower blows the air into the surroundings, but the air blown from the surroundings is sucked from squeezing pads 12 by connecting the inlet of the high pressure blower to the squeezing pads via a connecting channel.

Figure 4:
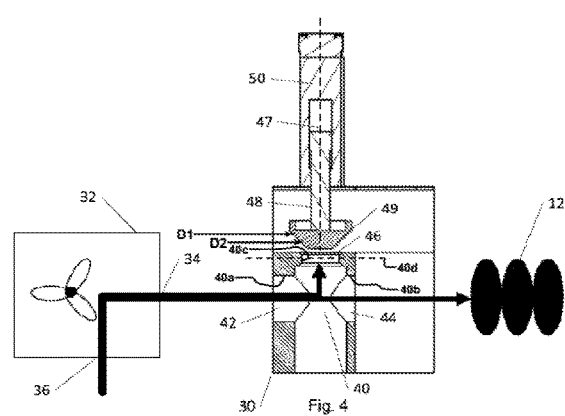
FIG. 4 illustrates an embodiment of a valve according to the present invention.

FIG. 4 illustrates an embodiment of a valve 30 according to the present invention for limiting and controlling the pressure delivered to the squeezing pads 12. The valve 30 is positioned between the high pressure blower 32 and the squeezing pads 12 and comprises a valve chamber 40 comprising: a first surface 40*a* defining a first opening 42 connected to the high pressure blower 32; a second surface 40*b* defining a second opening 44 connected to the squeezing pads 12; and a third surface 40*c* defining a third opening 46 extending along a radial axis 40*d*. Air is transferred between the high pressure blower 32 and the squeezing pads 12 though the valve chamber 40 via a primary set of openings comprising the first 42 and second 44 opening. Further, the valve chamber 40 has the third opening 46, whereby air from the first opening 42 can pass through the third opening 46, and where air not passing through the third opening 46 passes through the second opening 44. The valve further comprises means 48 for blocking the third opening 46 thereby changing the amount of air passing through the third opening 46.

The valve spool for blocking the third opening comprises a limiter element 49 having a varying diameter D1, D2 along its longitudinal axis 47, where the limiter element 49 is adapted to be inserted along its longitudinal axis 47 in the third opening 46, and where the extent of insertion of said limiter element changes the amount of air passing through the third opening 46.

The valve spool can be moved upwards and downwards along the longitudinal axis 47 e.g. by using a linear actuator 50 for controlling the exact position of the limiter element along the longitudinal axis 47 and thereby controlling the amount of air passing through the third opening 46 which again influences the air pressure in the squeezing pads.

In the illustrated example, the limiter element 49 is shaped as a cone with a diameter increasing in a direction away from the third opening. Thereby, the degree of insertion into the third hole 46 determines the air pressure in the squeezing pads 12, where no insertion implies a lower pressure than a complete insertion where the limiter element blocks the third opening 46.

Figure 5A:
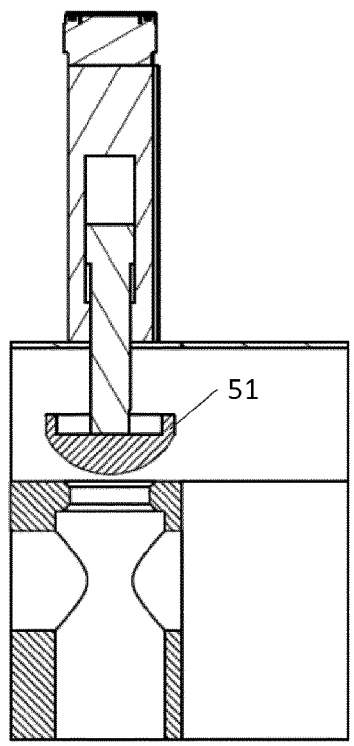
FIGS. 5A and 5B illustrate alternative embodiments of a limiter element of a valve according to the present invention.
Figure 5B:
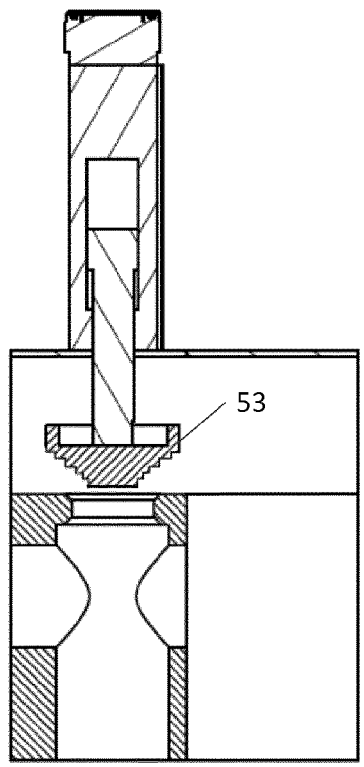

FIGS. 5A and 5B illustrate a valve similar to the one in FIG. 4, where the limiter element has been shaped differently. The limiter element 51 illustrated in FIG. 5A has a spherical shape, whereas the limiter in FIG. 5B has an inclined surface with a discrete surface.

The shaping of the limiter element changes the relation between degree of insertion and the amount of air passing the third opening. Reasons for using limiter element having different shapes could be to make control of the air pressure in the squeezing pads easier, e.g. adapted to the linear actuator moving the limiter element.

FIG. 6 illustrates another embodiment of a valve according to the present invention for limiting and controlling the pressure delivered to the squeezing pads. The valve comprises a valve chamber 60 comprising a first opening 62 for connecting to a high pressure blower and a second opening 64 for connecting to squeezing pads. Air is transferred between the squeezing pads and the high pressure blower though the valve chamber 60 via a primary set of openings comprising the first 62 and second 64 opening. Further, the valve chamber 60 has a third opening 66, whereby air from the first opening 62 can pass through the third opening 66, and where air not passing through the third opening 66 passes through the second opening 64. The valve further comprises means 68 for blocking the third opening 66 thereby changing the amount of air passing through the third opening 66.

The valve spool for blocking the third opening comprises a limiter element 69 having a varying diameter along its longitudinal axis 67, where the limiter element 69 is adapted to be inserted along its longitudinal axis 67 in the third opening 66, and where the extend of insertion of said limiter element 69 changes the amount of air passing through the third opening.

The valve spool 68 can be moved upwards and downwards along the longitudinal axis 67, e.g. by using a linear actuator (not shown) connected to the means for valve spool 68 and for controlling the exact position of the limiter element 69 along the longitudinal axis 67 and thereby controlling the amount of air passing through the third opening 66 which again influences the air pressure in the squeezing pads.

In the illustrated embodiment, the valve is an elongated cylindrical element having a valve chamber with additional openings for transferring air through the valve chamber. The holes comprise a first and a second set of auxiliary openings for transferring air. The first set comprises a fourth opening 71 and a fifth opening 72, and the second set comprises a sixth opening 73 and a seventh opening 74.

The valve spool comprises a blocking element 75 that is positioned inside the valve chamber and is connected to the valve spool 68, whereby the blocking element 75 is moved up/down synchronously with the valve spool 68 and the limiter element 69 when the valve spool 68 is moved up/down inside the valve chamber by the linear actuator.

The blocking element 75 is shaped in a manner, whereby different positions inside the valve chamber 60 ensure access through the valve chamber through specific sets of openings being either the primary set of openings or the auxiliary sets of openings.

The blocking element 75 further comprises a guiding element 76, and the end opposite the limiter element 69 ensures that the blocking element is aligned inside the valve chamber when being moved up/down.

Figure 6A:
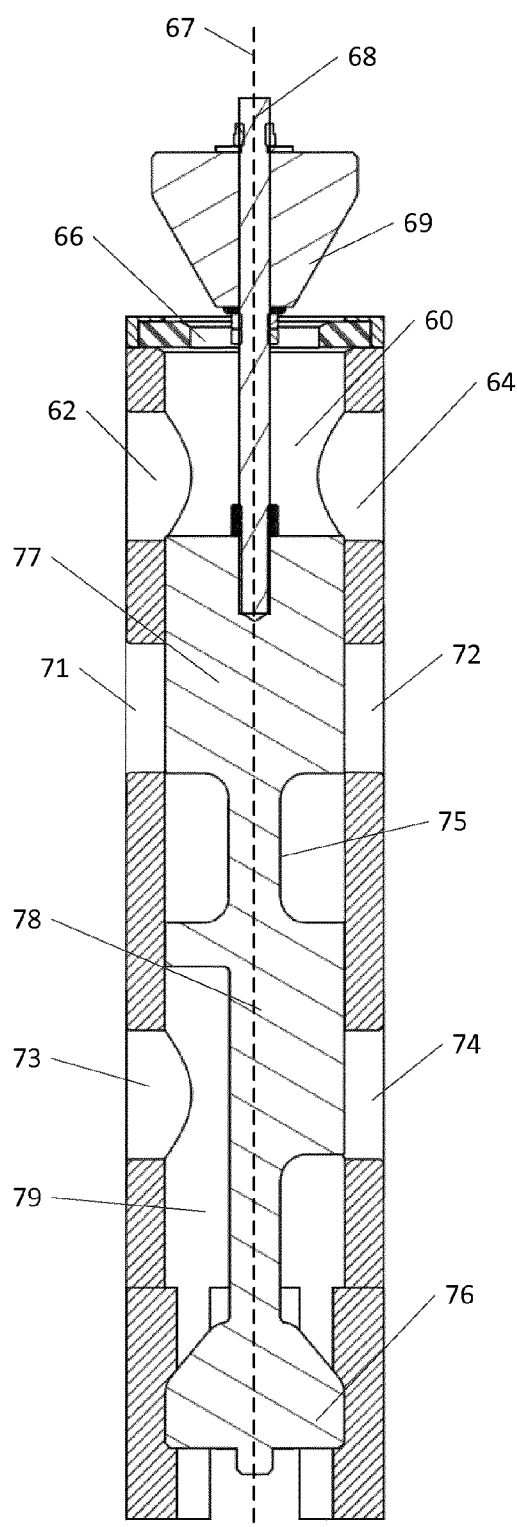
FIGS. 6A and 6B illustrate an embodiment of a valve according to the present invention.

In FIG. 6A, a first position of the valve spool 68 is illustrated, where access air can flow through the primary set of openings, and where the auxiliary sets of openings are blocked by the valve spool. A first part 77 of the valve spool 75 ensures that the chamber is blocked, whereby air can only pass through the primary set of openings and potentially the third opening depending on the position of the limiter element 69. Further, the first part 77 of the valve spool blocks the first set of auxiliary openings 71, 72 and is shaped in a manner whereby blocking of the first set of auxiliary openings is maintained even when the limiter element and thereby the blocking element are moved downwards, then. The second part 78 of the valve spool blocks the second auxiliary opening 74 and is shaped in a manner whereby blocking of the second auxiliary opening is maintained even when the limiter element and thereby the blocking element are moved downwards. Further, the second part is shaped such that access can be obtained from the sixth opening and the surroundings, e.g. for sucking or blowing air from the high pressure blower via another opening (not shown) accessible from the chamber 79.

Figure 6B:
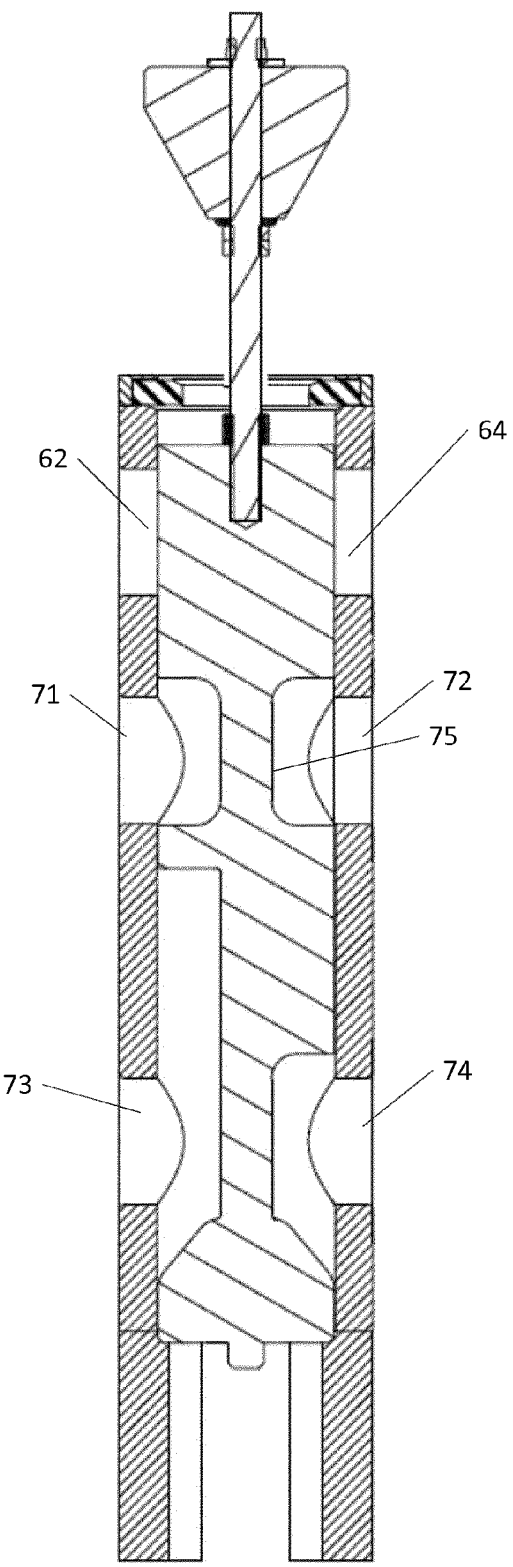

In FIG. 6B, a second position of the valve spool is illustrated and in this position, the primary set of openings 62, 64 are blocked by the blocking element 75. The first and second auxiliary sets of openings are not blocked, whereby air can pass through the valve chamber.

Figure 7A:
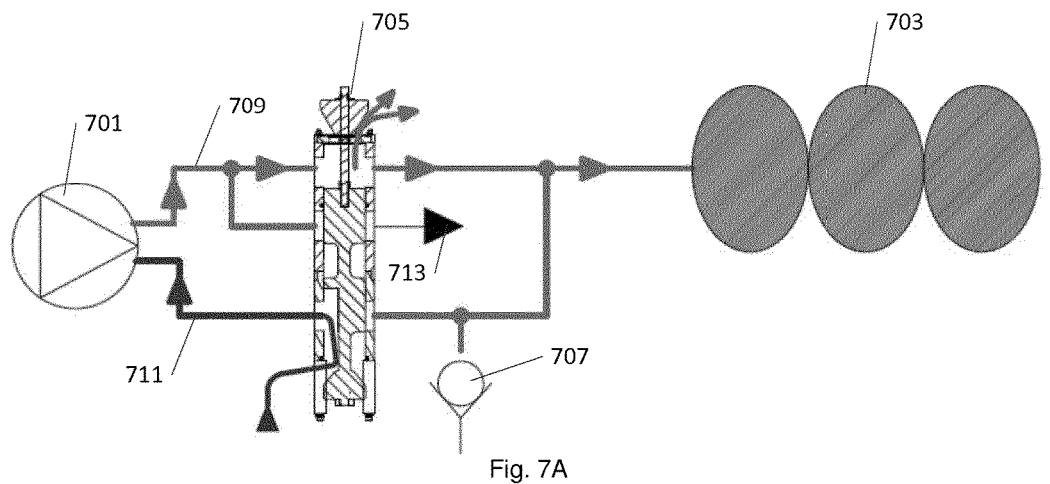
FIGS. 7A and 7B illustrate an embodiment of operating a valve as illustrated in FIGS. 6A and 6B when used for handling air supply between blower and squeezing pads.
Figure 7B:
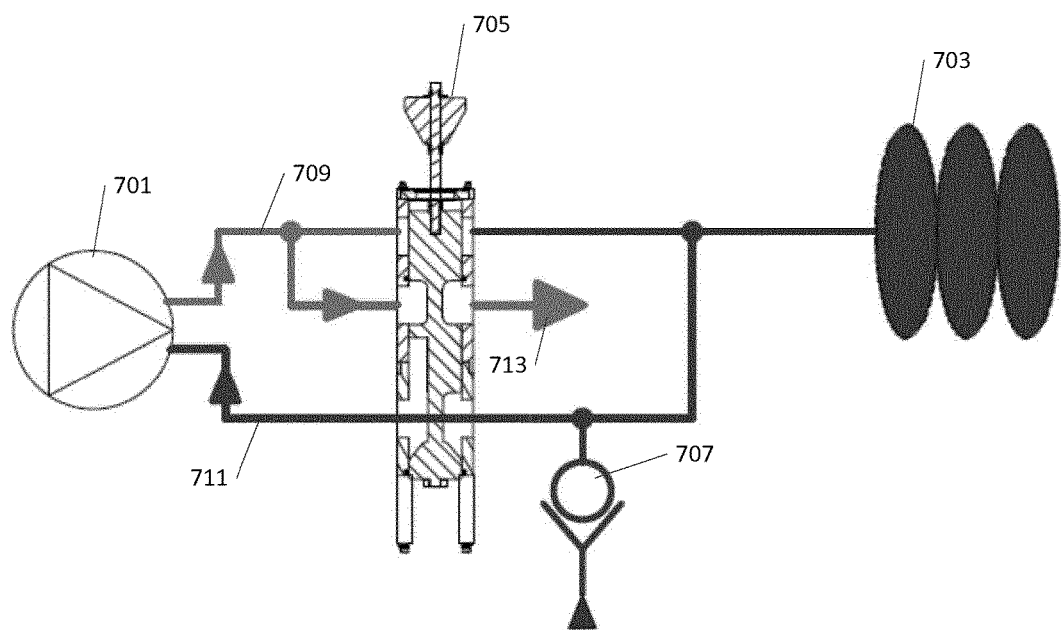

In FIGS. 7A and 7B, a setup is illustrated, where the valve embodiment explained in connection with FIGS. 6A and 6B are used as valve for controlling the air in the squeezing pads. In the figures, the valve 705 is connected between the high pressure blower 701 and the squeezing pads 703.

In FIG. 7A, the air flow is illustrated when blowing air into the squeezing pads 703, where air blown from the high pressure blower 701 flows through the primary set of openings in the valve 705 and further through the third opening regulated by the limiter element. Thereby, the air pressure delivered by the high pressure blower is limited by the valve 705, and a predefined air pressure is obtained by controlling the size of the third opening via the limiter element and the valve spool. The delivered air is further connected to an opening of the first auxiliary set of openings, but this opening is being blocked by the valve spool. Further, the opposite opening is only connected to the surroundings 713. At the opposite side of the valve 705, the delivered air flow is further connected to a check valve 707 and an opening on the second set of auxiliary openings, but when blowing air into the squeezing pads 703, the air is blocked by both the check valve 707 and the valve spool, whereby all regulated air is delivered to the squeezing pads 703.

The high pressure blower sucks air 711 from the surroundings via the valve 705 and more specifically via the sixth opening connected to the surroundings.

In FIG. 7B, the air flow is illustrated when sucking air out of the squeezing pads 703. Here, the means for valve spool in the valve 705 is moved to a different position, whereby the primary set of openings is blocked, and the auxiliary sets of openings are opened. Air flow from the high pressure blower 701 flows through the first auxiliary set of openings and to the surroundings 713. Additionally, air 711 is sucked into the high pressure blower via the second auxiliary set of openings from the squeezing pads, where the check valve 707 ensures that the valve opens for sucking air from the surroundings when no more air is present in the squeezing pads.

Figure 8A:
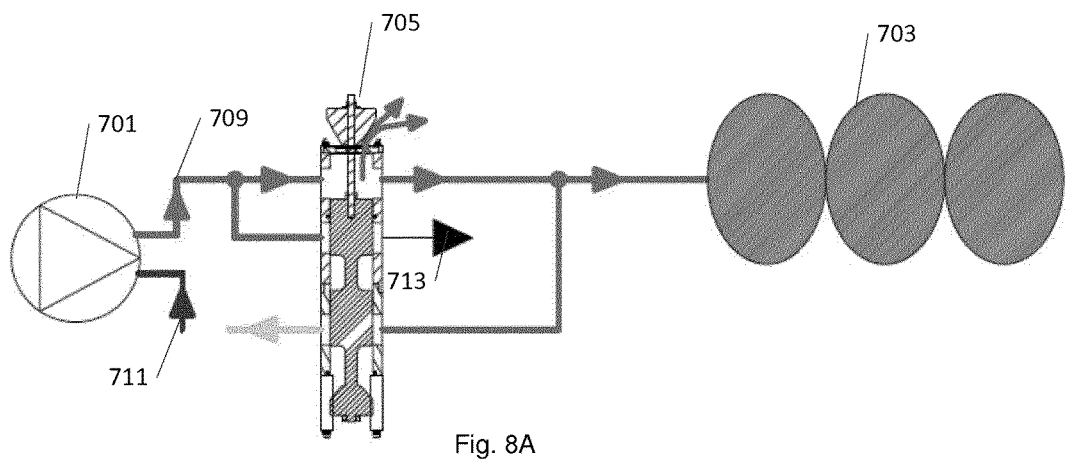
FIGS. 8A and 8B illustrate an embodiment of operating a valve as illustrated in FIGS. 6A and 6B when used for handling air supply between blower and squeezing pads, FIG. 9 parts A and B illustrates a control algorithm A for controlling the lift head and lifting of goods by the lift head, where a part of this overall control is a valve control algorithm B.
Figure 8B:
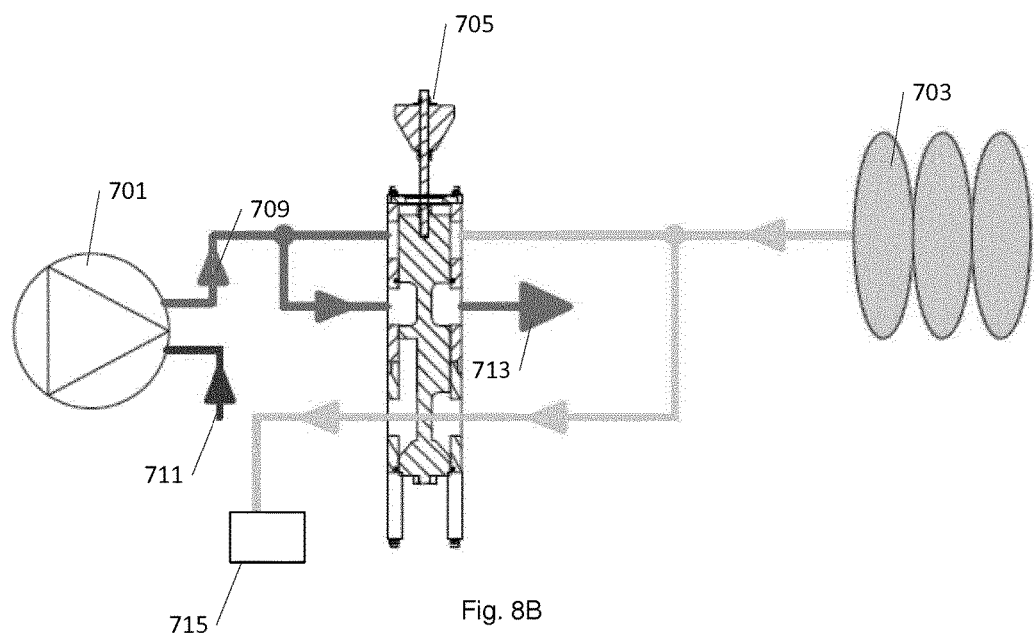

In FIGS. 8A and 8B, an alternative setup is illustrated, where air is sucked out of the squeezing valves by means of a Vacuum pump/Vacuum reservoir.

In FIG. 8A, the air flow is illustrated when blowing air into the squeezing pads, where air flow from the high pressure blower 709 flows through the primary set of openings in the valve element 705 and further through the third opening being regulated by the limiter element. Thereby, the air pressure delivered by the high pressure blower is limited by the valve 705 and a predefined air pressure is obtained by controlling the size of the third opening via the limiter element and the valve spool. Further, the delivered air is connected to an opening of the first auxiliary set of openings, but this opening is blocked by the blocking element. Further, the opposite opening is only connected to the surroundings 713. At the opposite side of the valve 705, the delivered air flow is also connected to an opening on the second set of auxiliary openings. When blowing air into the squeezing pads, the air is blocked by the valve spool, whereby all air is delivered to the squeezing pads. The high pressure blower sucks air 711 from the surroundings.

In FIG. 8B, the air flow is illustrated when sucking air out of the squeezing pads 703. Here, the valve spool in the valve 705 is moved to a different position, whereby the primary set of openings is blocked and the auxiliary sets of openings are opened. Air blown from the high pressure blower 709 flows through the first auxiliary set of openings and to the surroundings 713. Additionally, air 711 is sucked into the high pressure blower from the surroundings Air from the squeezing pads is sucked out by means of a vacuum pump/vacuum reservoir 715 though the second auxiliary set of openings in the valve.

Figure 9:
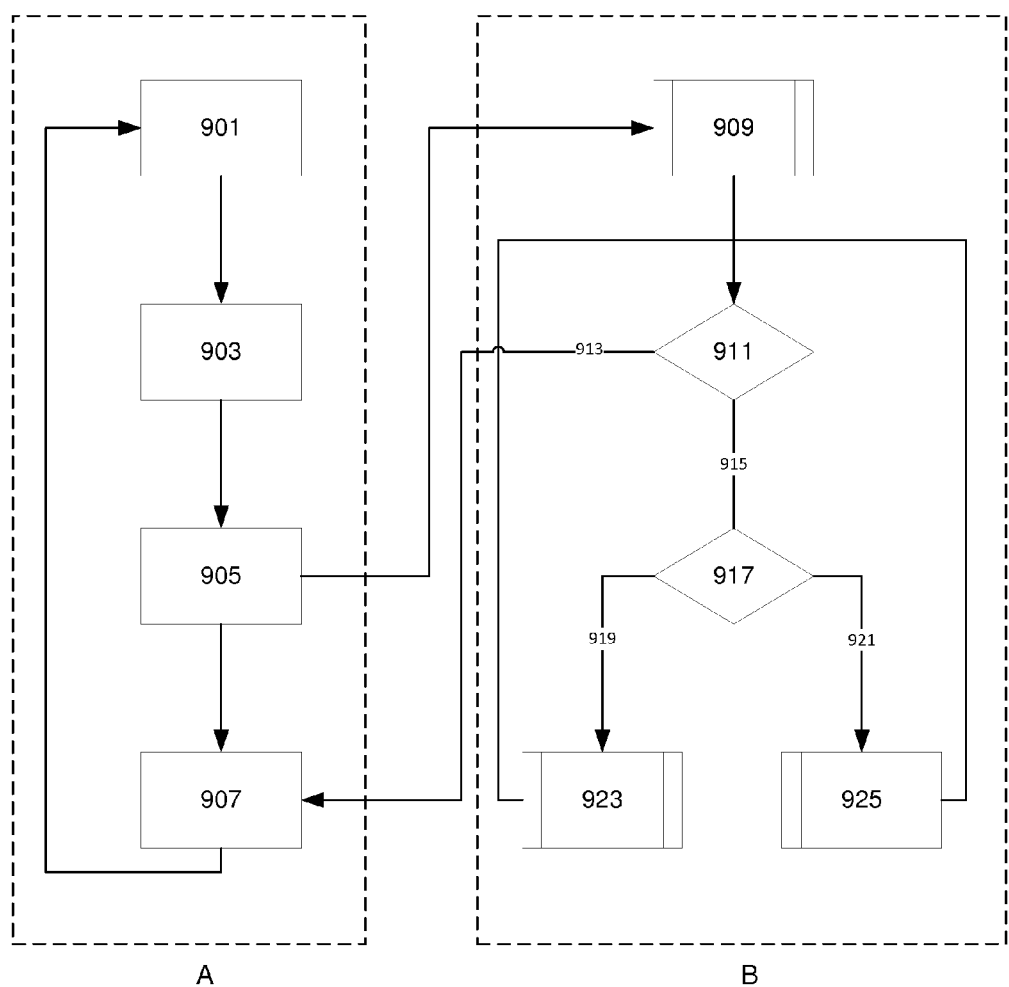

In FIG. 9 parts A and B, the flow diagram of an embodiment of a control algorithm A is illustrated for controlling the lift head and lifting of goods by the lift head: A part of this overall control is a valve control algorithm B for controlling the valve and thereby the air pressure in the squeezing pads.

In 901, it is decided which overall control algorithm is to be used for lifting the goods. The overall control algorithm is specifically adapted to the type of goods to be lifted, and these specifics include a reference air pressure level to be made in the inflatable squeezing pads during lifting. As mentioned earlier, this air pressure depends on the type of goods to be lifted, e.g. a higher pressure is needed for lifting heavy goods, whereas fragile goods could be damaged with too high a pressure. When starting this algorithm, the limiter element (e.g. 69 FIGS. 6A and 6B) is not blocking the third opening (e.g. 66 FIGS. 6A and 6B) of the valve chamber (e.g. 60 FIGS. 6A and 6B). The initial position of the valve spool could be as illustrated in FIG. 6B.

In the next step 903, the valve spool (e.g. 68 FIGS. 6A and 6B) is moved downwards along the longitudinal axis (e.g. 67 FIGS. 6A and 6B), e.g. by using a linear actuator for moving the limiter element until no or at least a minimum of air can pass through the third opening. Thereby, all air from the air blower is led into the squeezing pads and this position of the limiter element is maintained until ⅔ of the reference air pressure level is obtained. When ⅔ of the reference air pressure is obtained (being read by an air pressure measuring device for reading the air pressure in the squeezing pads), the linear actuator moves the limiter element upwards along the longitudinal axis until the limiter element reaches a position corresponding to the reference air pressure level. This could be derived from a database as described in the following.

A database could comprise a table where reference air pressure data is linked to positions of the limiter element, whereby the corresponding position of the limiter element is read from the database and the valve spool when a specific air pressure is needed and thereby, the limiter element is moved to this position. In one embodiment, the database could comprise links between five different reference air pressures and corresponding limiter element position. The data in the database is provided by a tuning algorithm described in FIG. 10.

In the next step 905, the remaining air is blown into the squeezing pads until the reference air pressure is obtained, and the air pressure is maintained until the lifting process ends. This is being done by an air pressure control algorithm being described in part B of FIG. 9.

In 907, when the lifting process ends, the squeezing pads are emptied, e.g. by moving the valve pool back to the initial position in 901 and as illustrated in FIG. 6B.

In part B of FIG. 9, an embodiment of the process of obtaining the reference pressure and maintaining this reference pressure is described. In 909, the reference pressure is received from the overall control algorithm and in 911, it is determined whether this pressure is already present in the squeezing pads. If the pressure is present 913, the position of the limiter element is maintained until the lifting process is ended 907. If the pressure in the squeezing pads is not 915 according to the reference pressure, then in 917 it is determined whether the pressure is too high 919, and the valve pool and the limiter element are moved upwards. If the pressure in the squeezing pads is too low 921, then the valve pool and the limiter element are moved downwards.

Figure 10:
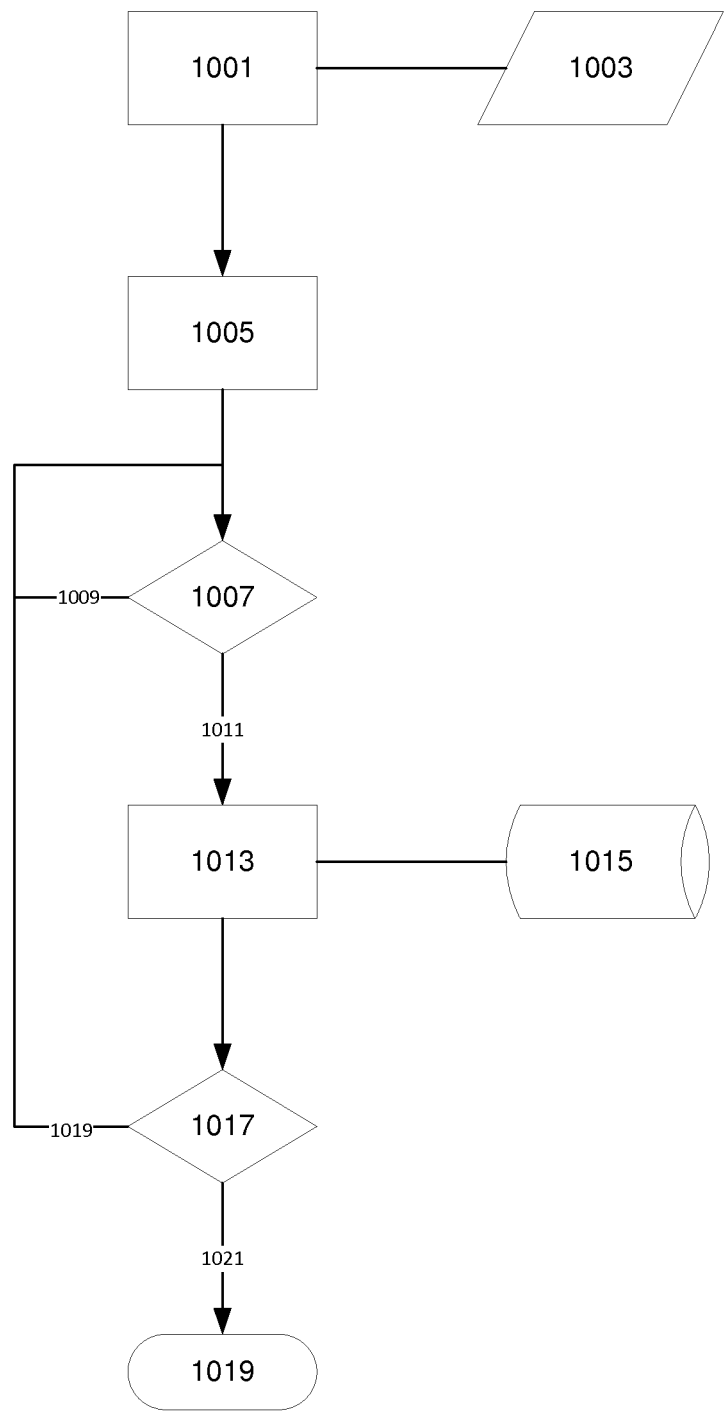
FIG. 10 illustrates an embodiment of a tuning algorithm.

In FIG. 10, an embodiment of a tuning algorithm is described. This algorithm identifies limiter element positions corresponding to reference air pressures and stores this linking in a database 1015.

Such auto tuning could be necessary because of replacement of the squeezing pads and or due to wear of the squeezing pads and increasing airflow through the squeezing bags, whereby more of the blower air is necessary to maintain a specific pressure.

Initially in 1001, reference air pressure data 1003 is read. This data could be pre-stored in a database and/or defined by the user according to specific needs. The limiter element is positioned such that the limiter element does not block the third opening of the valve chamber. Then, the actuator moves the limiter element slowly downwards into the third opening, whereby blocking of the opening and the air pressure in the squeezing pads increase gradually. The air pressure in the squeezing pads is measured in 1007, and this is done until 1009. The air pressure equals a reference air pressure. The position of the limiter element is read and in 1013, the coupling between air pressure and position is stored in the database 1015. Next in 1017, it is determined whether all reference air data has been identified and if not 1019, the moving downwards of the limiter element is continued, and the air pressure in the squeezing pads are measured in 1007, and this is done until 1009 when the air pressure equals a reference air pressure. When all reference air pressure data has been linked to a position, the tuning algorithm ends 1019.

Figure 11:
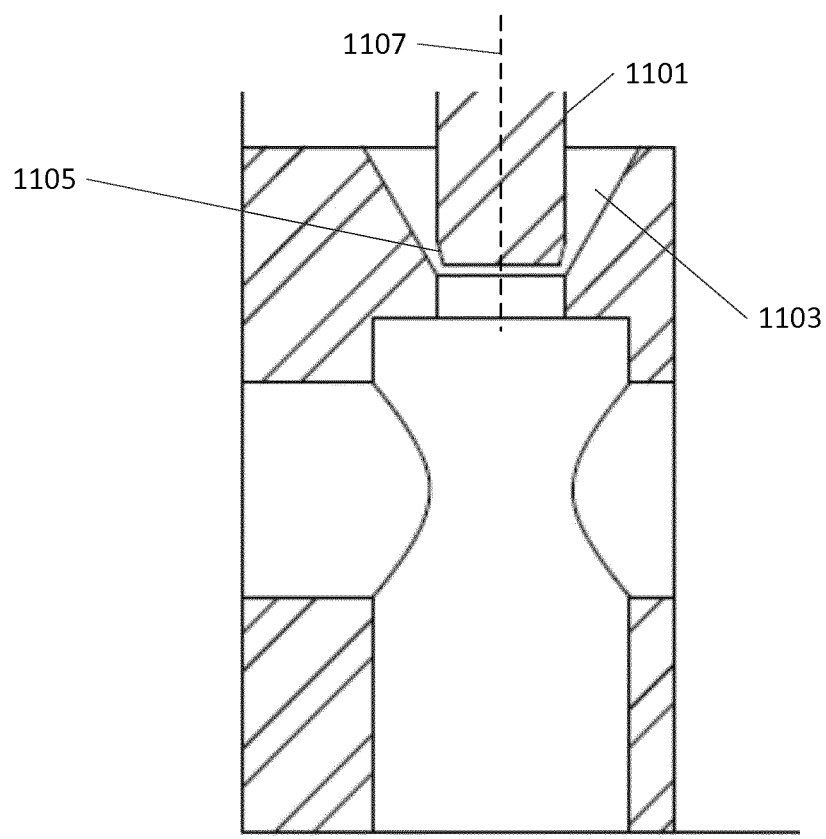
FIG. 11 illustrates an alternative embodiment of a valve according to the present invention, where the third opening has a varying diameter.

FIG. 11 illustrates an alternative embodiment of a valve according to the present invention, where the third opening 1103 has a varying diameter. In this embodiment, the limiter element 1101 is formed as a rod with side surfaces parallel to the longitudinal axis 1107 of the valve spool and by moving the limiter element upwards and downwards in the opening, the amount of air passing through can be controlled. In embodiments not shown, a variety of shapes of respectively the limiting element and the opening can be chosen, where the shapes interact in a manner whereby the air flow through the third opening can be controlled in a predetermined manner. In the embodiment, the limiter element has inclined edges 1105 at the tip. This is both related to the finishing of the element as well as to ensure that the limiter element is controlled into the opening. Further, this also ensures air flow between the limiter element and the opening having a specific characteristic.

REFERENCE NUMBERS 2 lift head
5 lift head surface
6 suction face
10 adjustment element
12, 703 inflatable squeezing pads
15 pallet layer
30, 705 valve
32, 701 high pressure blower
34 outlet of high pressure blower
36 inlet of high pressure blower
40, 60 valve chamber
42, 62 first opening of valve chamber
44, 64 second opening of valve chamber
46, 66, 1103 third opening of valve chamber
47, 67, 1107 longitudinal axis of valve spool
48, 68 valve spool
49, 69, 1101 limiter element
71 fourth opening of valve chamber
72 fifth opening of valve chamber
73 sixth opening of valve chamber
74 seventh opening of valve chamber
75 blocking element
76 guiding element
77 first part of valve spool
78 second part of valve spool
79 chamber next to sixth opening
709 air flow blown from high pressure blower
713 surroundings
707 check valve
711 air flow sucked to the high pressure blower
1105 inclined edge of limiter element

The invention claimed is:

1. A valve operable to control a flow of air into at least one squeezing pad, the flow coming from a high pressure blower, said valve comprising:
   a valve chamber comprising a primary set of openings, the primary set comprising:
      a first opening fluidly configured to be connected to said high pressure blower to receive the air; and
      a second opening fluidly connected to the at least one squeezing pad to enable the air to be at least partially transferred to the at least one squeezing pad,
   wherein said valve chamber further comprises a third opening configured to enable the air from said first opening to at least partially pass through said third opening,
   wherein said valve further comprises a valve spool configured to block said third opening and thereby change an amount of the air that passes through said third opening,
   wherein said valve spool comprises a limiter element extending along a longitudinal axis,
   wherein one of said limiter element or said third opening comprises a diameter that varies along the longitudinal axis of said limiter element,
   wherein the limiter element is configured to be at least partially inserted along the longitudinal axis in said third opening,
   wherein the limiter element is configured so that an extent of the insertion of said limiter element is configured to be controlled,
   wherein the extent of insertion of said limiter element changes the amount of the air that passes through said third opening so as to control how much of the air passes through said second opening, and
   wherein said limiter element comprises a diameter increasing in a direction away from the third opening.

2. A valve operable to control a flow of air into at least one squeezing pad, the flow coming from a high pressure blower, said valve comprising:
   a valve chamber comprising a primary set of openings, the primary set comprising:
      a first opening fluidly configured to be connected to said high pressure blower to receive the air; and
      a second opening fluidly connected to the at least one squeezing pad to enable the air to be at least partially transferred to the at least one squeezing pad,
   wherein said valve chamber further comprises a third opening configured to enable the air from said first opening to at least partially pass through said third opening,
   wherein said valve further comprises a valve spool configured to block said third opening and thereby change an amount of the air that passes through said third opening,
   wherein said valve spool comprises a limiter element extending along a longitudinal axis,
   wherein one of said limiter element or said third opening comprises a diameter that varies along the longitudinal axis of said limiter element,
   wherein the limiter element is configured to be at least partially inserted along the longitudinal axis in said third opening,
   wherein the limiter element is configured so that an extent of the insertion of said limiter element is configured to be controlled,
   wherein the extent of insertion of said limiter element changes the amount of the air that passes through said third opening so as to control how much of the air passes through said second opening, and wherein said limiter element is configured to be connected to an actuator to move said limiter element along the longitudinal axis.

3. A lift head configured to lift an object, the lift head comprising the at least one squeezing pad of claim 2 and the valve of claim 2.

4. The lift head of claim 3, wherein the lift head further comprises a curtain configured to close below said lifted object.

5. The lift head of claim 4, wherein said lift head further comprises a suction face.

6. An apparatus operable to handle a plurality of layers of palletised goods, the apparatus comprising the lift head of claim 3.

7. The valve of claim 2, wherein:
the valve spool is configured so that:
the limiter element is moveable between a plurality of positions relative to the third opening; and
an adjustment between the positions changes a magnitude of pressurization of the at least one squeezing pad even when a constant pressure is generated by the high pressure blower; and
the limiter element comprises a configuration comprising one of: (a) a conical shape; (b) at least a partial spherical shape; or (c) a stepped shape.

8. A valve operable to control a flow of air into at least one squeezing pad, the flow coming from a high pressure blower, said valve comprising:
a valve chamber comprising a primary set of openings, the primary set comprising:
a first opening fluidly configured to be connected to said high pressure blower to receive the air; and
a second opening fluidly connected to the at least one squeezing pad to enable the air to be at least partially transferred to the at least one squeezing pad,
wherein said valve chamber further comprises a third opening configured to enable the air from said first opening to at least partially pass through said third opening,
wherein said valve further comprises a valve spool configured to block said third opening and thereby change an amount of the air that passes through said third opening,
wherein said valve spool comprises a limiter element extending along a longitudinal axis,
wherein one of said limiter element or said third opening comprises a diameter that varies along the longitudinal axis of said limiter element,
wherein the limiter element is configured to be at least partially inserted along the longitudinal axis in said third opening,
wherein the limiter element is configured so that an extent of the insertion of said limiter element is configured to be controlled,
wherein the extent of insertion of said limiter element changes the amount of the air that passes through said third opening so as to control how much of the air passes through said second opening, and
wherein said valve further comprises a blocking element connected to said valve spool, said blocking element being configured to block a plurality of auxiliary sets of openings in said valve chamber.

9. The valve of claim 8, wherein said auxiliary sets of openings comprise a first and a second set of auxiliary openings.

10. A valve assembly comprising:
a valve chamber comprising:
a first surface defining a first opening configured to receive an airflow from a pressure source, where the pressure source is configured to generate the airflow at a constant pressure;
a second surface defining a second opening configured to be fluidly connected to an inflatable squeezing pad of a lifting device;
a third surface defining a third opening configured to communicate with an environment, wherein the third opening surrounds a center positioned on a radial axis; and
a blocker configured to be movably coupled to the valve chamber, the blocker configured to be moved along a longitudinal axis relative to the valve chamber, wherein the blocker comprises an insertion portion configured to be at least partially inserted into the third opening,
wherein the insertion portion is configured to be adjusted between a plurality of positions along the longitudinal axis relative to the third surface,
wherein, at a first one of the positions, there is no radial gap extending along the radial axis between the insertion portion and the third surface,
wherein, at a second one of the positions, there is a first radial gap extending along the radial axis between the insertion portion and the third surface,
wherein, at a third one of the positions, there is a second radial gap extending along the radial axis between the insertion portion and the third surface, the second radial gap being greater than the first radial gap.

11. The valve assembly of claim 10, wherein the valve assembly is configured so that the adjustment between the first, second and third positions changes a magnitude of pressurization of the inflatable squeezing pad even when the constant pressure is generated by the pressure source.

12. The valve assembly of claim 11, wherein the insertion portion comprises a conical shape.

13. The valve assembly of claim 11, wherein the insertion portion comprises at least a partial spherical shape.

14. The valve assembly of claim 11, wherein the insertion portion comprises a stepped shape.

15. The valve assembly of claim 11, wherein the third surface extends along an axis that is transverse to the longitudinal axis.

16. The valve assembly of claim 11, wherein, when the insertion portion is inserted into the third opening, the insertion portion extends along an axis that is transverse to the longitudinal axis.

17. The valve assembly of claim 10, wherein, in the first position, the insertion portion and the third surface are configured to be engaged together.

18. The valve assembly of claim 10, wherein the blocker comprises an actuator coupling portion configured to be coupled to an actuator, wherein the actuator is operable to control the adjustment of the insertion portion between the first, second and third positions.

19. A valve assembly comprising:
a valve chamber comprising:
a first surface defining a first opening configured to receive an airflow from a pressure source, where the pressure source is configured to generate the airflow at a constant pressure;
a second surface defining a second opening configured to be fluidly connected to an inflatable squeezing pad of a lifting device; and a third surface defining a third opening configured to communicate with an environment, wherein the third opening surrounds a center positioned on a radial axis; and a blocker configured to be movably coupled to the valve chamber, the blocker configured to be moved along a longitudinal axis relative to the valve chamber, wherein:

the blocker comprises an insertion portion configured to be at least partially inserted into the third opening; and the blocker is configured to be coupled to an actuator, wherein the actuator is configured to control an adjustment of the insertion portion between first, second and third positions relative to the third surface, wherein, in the first position:

the insertion portion is located inside of the third opening and is engaged with the third surface;

the insertion portion blocks any of the airflow from passing through the third opening; and the airflow passes through the second opening to pressurize the inflatable squeezing pad at a first pressure based on the constant pressure generate by the pressure source, wherein, in the second position:

the insertion portion is located within the third opening so that there is a first gap between the insertion portion and the third surface, the first gap extending along the radial axis; and the first gap enables a first amount of the airflow to pass through the third opening, thereby causing a second pressure that is lower than the first pressure; and the airflow partially passes through the second opening to pressurize the inflatable squeezing pad at the second pressure based on the constant pressure generate by the pressure source, wherein, in the third position:

the insertion portion is located within the third opening so that there is a second gap between the insertion portion and the third surface, wherein the second gap extends along the radial axis;

the second gap is greater than the first gap;

the second gap enables a second amount of the airflow to pass through the third opening, thereby causing a third pressure that is lower than the second pressure; and the airflow partially passes through the second opening to pressurize the inflatable squeezing pad at the third pressure based on the constant pressure generate by the pressure source.

20. The valve assembly of claim 19, wherein the blocker comprises a valve spool.

* * * * *